US010276193B2

(12) United States Patent
Narita et al.

(10) Patent No.: US 10,276,193 B2
(45) Date of Patent: Apr. 30, 2019

(54) MAGNETIC HEAD HAVING MAGNETIC POLE AND SHIELD, AND MAGNETIC RECORDING AND REPRODUCING DEVICE

(71) Applicant: KABUSHIKI KAISHA TOSHIBA, Tokyo (JP)

(72) Inventors: Naoyuki Narita, Kanagawa (JP); Tomoyuki Maeda, Kanagawa (JP); Masaya Ohtake, Kanagawa (JP); Gaku Koizumi, Kanagawa (JP); Yusuke Tomoda, Kanagawa (JP); Akihiko Takeo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/913,288

(22) Filed: Mar. 6, 2018

(65) Prior Publication Data
US 2019/0088275 A1 Mar. 21, 2019

(30) Foreign Application Priority Data
Sep. 19, 2017 (JP) ................................ 2017-179456

(51) Int. Cl.
*G11B 5/31* (2006.01)
(52) U.S. Cl.
CPC .................................. *G11B 5/315* (2013.01)
(58) Field of Classification Search
CPC ...................................................... G11B 5/315
See application file for complete search history.

(56) References Cited

U.S. PATENT DOCUMENTS

| 7,869,160 B1* | 1/2011 | Pan ........................... G11B 5/11 360/119.02 |
| 2006/0067006 A1* | 3/2006 | Takagishi ................. G11B 5/35 360/319 |
| 2007/0195453 A1* | 8/2007 | Kameda ............... G11B 5/1278 360/119.05 |
| 2011/0310510 A1 | 12/2011 | Anagawa et al. |
| 2014/0104724 A1 | 4/2014 | Shiroishi et al. |

(Continued)

FOREIGN PATENT DOCUMENTS

| JP | 2014-81981 A | 5/2014 |
| JP | 2014-130672 A | 7/2014 |

(Continued)

*Primary Examiner* — Brian E Miller
(74) *Attorney, Agent, or Firm* — Finnegan, Henderson, Farabow, Garrett & Dunner, L.L.P.

(57) ABSTRACT

According to one embodiment, a magnetic head includes a magnetic pole having a first surface, a first shield separated from the magnetic pole along the first surface, and a stacked body provided between the magnetic pole and the first shield. The stacked body includes a magnetic layer, and first and second conductive layers. The magnetic layer includes at least one selected from the group consisting of Fe, Co, and Ni. The first conductive layer contacts the magnetic pole and the magnetic layer, and is provided between the magnetic pole and the magnetic layer. The second conductive layer contacts the magnetic layer and the first shield, is provided between the magnetic layer and the first shield. The first shield has a first shield surface contacting the second conductive layer. A ratio of a length of the magnetic layer to a length of the first shield surface is 0.1 or more.

18 Claims, 14 Drawing Sheets

(56) References Cited

U.S. PATENT DOCUMENTS

| | | | |
|---|---|---|---|
| 2014/0146420 A1 | 5/2014 | Shimizu et al. | |
| 2016/0035373 A1* | 2/2016 | Takagishi | G11B 5/11 360/125.03 |
| 2018/0261241 A1 | 9/2018 | Narita et al. | |

FOREIGN PATENT DOCUMENTS

| | | |
|---|---|---|
| JP | 2018-146314 A | 9/2018 |
| JP | 2018-147540 A | 9/2018 |
| JP | 2018-158709 A | 10/2018 |

* cited by examiner

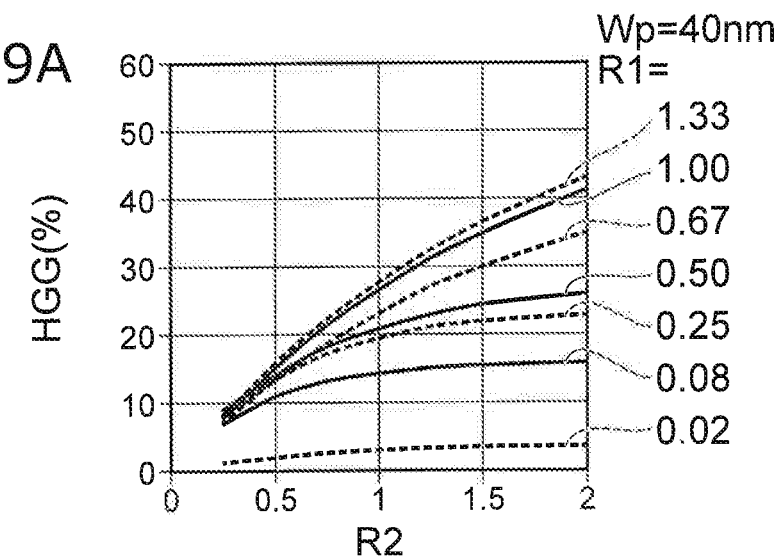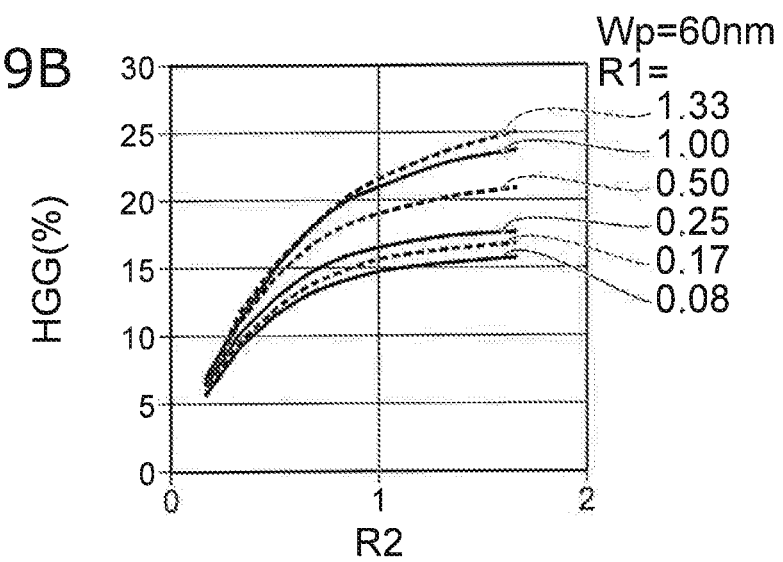

MAGNETIC HEAD HAVING MAGNETIC POLE AND SHIELD, AND MAGNETIC RECORDING AND REPRODUCING DEVICE

CROSS-REFERENCE TO RELATED APPLICATIONS

This application is based upon and claims the benefit of priority from Japanese Patent Application No. 2017-179456, filed on Sep. 19, 2017; the entire contents of which are incorporated herein by reference.

FIELD

Embodiments described herein relate generally to a magnetic head and a magnetic recording and reproducing device.

BACKGROUND

Information is recorded in a magnetic storage medium of a HDD (Hard Disk Drive), etc., by using a magnetic head. It is desirable to increase the recording density of the magnetic head and a magnetic recording and reproducing device.

BRIEF DESCRIPTION OF THE DRAWINGS

FIG. 9A and FIG. 9B are graphs illustrating the characteristics of the magnetic head;

DETAILED DESCRIPTION

Figure 1A:
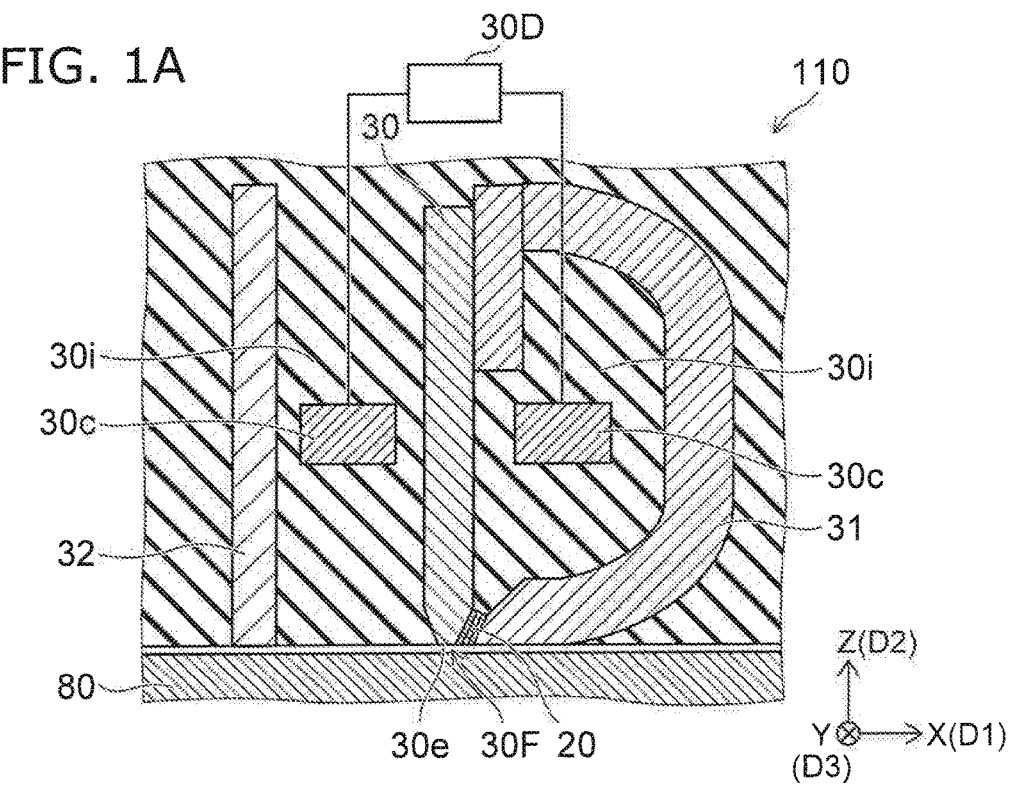
FIG. 1A and FIG. 1B are schematic cross-sectional views illustrating a magnetic head according to a first embodiment.

According to one embodiment, a magnetic head includes a magnetic pole having a first surface, a first shield separated from the magnetic pole along a first direction aligned with the first surface, and a stacked body provided between the magnetic pole and the first shield. The stacked body includes a magnetic layer, a first conductive layer, and a second conductive layer. The magnetic layer includes at least one selected from the group consisting of Fe, Co, and Ni. The first conductive layer contacts the magnetic pole and the magnetic layer, is provided between the magnetic pole and the magnetic layer, and is nonmagnetic. The second conductive layer contacts the magnetic layer and the first shield, is provided between the magnetic layer and the first shield, and is nonmagnetic. The first shield has a first shield surface contacting the second conductive layer. A first ratio of a length of the magnetic layer along a second direction to a length of the first shield surface along the second direction is 0.1 or more, the second direction being perpendicular to the first surface.

According to another embodiment, a magnetic recording and reproducing device includes the magnetic head described above, a magnetic recording medium where information is recorded by the magnetic head, and an electrical circuit configured to supply a current to a stacked body including the first conductive layer, the magnetic layer, and the second conductive layer.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
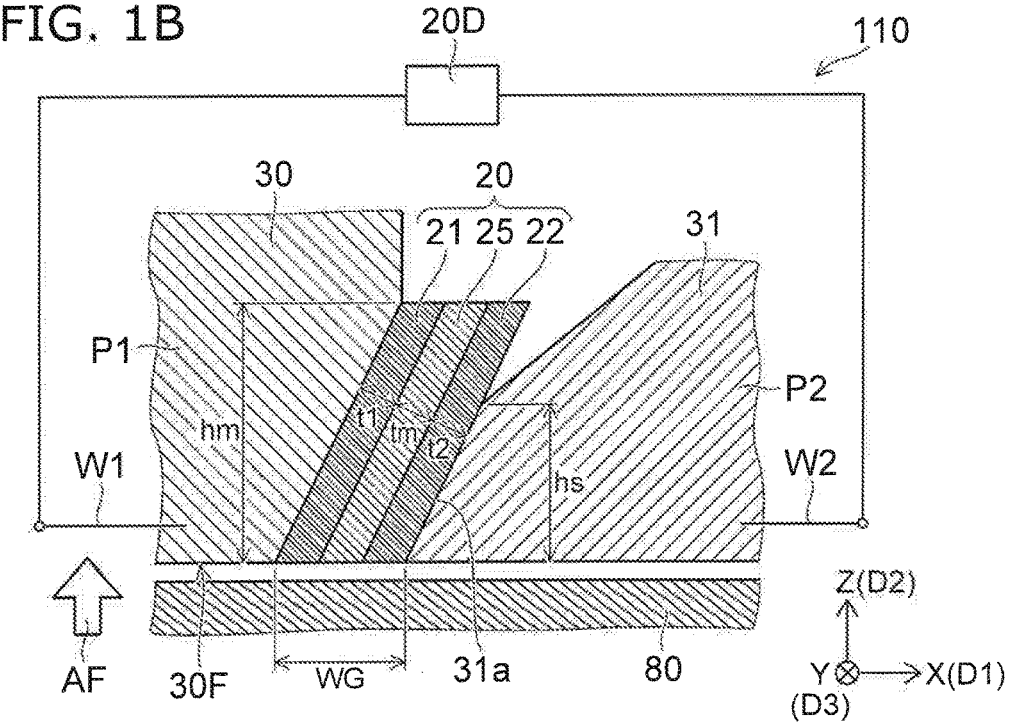

FIG. 1A and FIG. 1B are schematic cross-sectional views illustrating a magnetic head according to a first embodiment.

Figure 2:
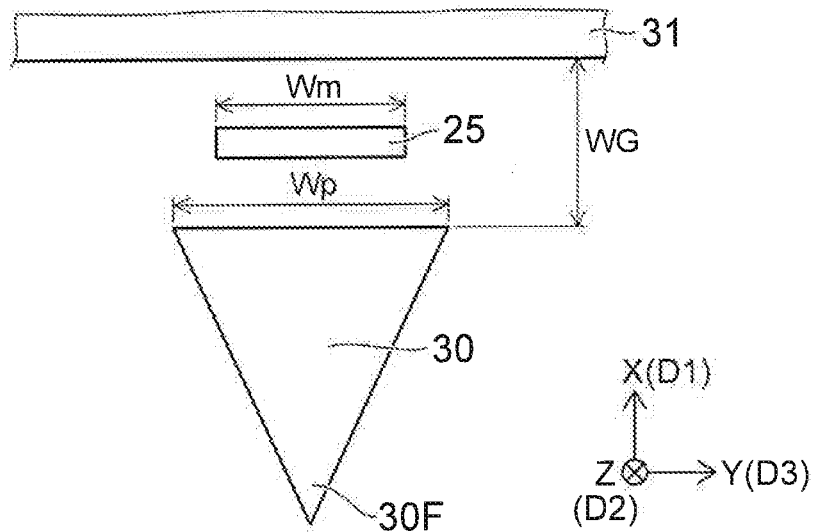
FIG. 2 is a schematic plan view illustrating the magnetic head according to the first embodiment.

FIG. 2 is a schematic plan view illustrating the magnetic head according to the first embodiment.

FIG. 1B is an enlarged view of a portion of FIG. 1A. FIG. 2 is a plan view as viewed along arrow AF of FIG. 1B.

As shown in FIG. 1A, the magnetic head 110 according to the embodiment includes a magnetic pole 30, a first shield 31, and a stacked body 20. A second shield 32 and a coil 30c are further provided in the example.

The magnetic pole 30 is positioned between the first shield 31 and the second shield 32. At least a portion of the coil 30c is positioned between the magnetic pole 30 and the first shield 31, In the example, a portion of the coil 30c is positioned between the magnetic pole 30 and the second shield 32.

A recording electrical circuit (a second electrical circuit 30D) is electrically connected to the coil 30c. A recording current is supplied from the recording electrical circuit to the coil 30c; and a magnetic field (a recording magnetic field) that corresponds to the recording current is generated from the magnetic pole 30. The recording magnetic field is applied to a magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

The stacked body 20 is provided between the magnetic pole 30 and the first shield 31.

An insulating portion 30i is provided around the magnetic pole 30, the first shield 31, the second shield 32, the coil 30c, and the stacked body 20.

A first surface 30F is provided at an end 30e of the magnetic pole 30. The first surface 30F is, for example, a medium-opposing surface. The first surface 30F is aligned with the ABS of the magnetic head 110. The first surface 30F opposes the magnetic recording medium 80.

A direction perpendicular to the first surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction.

The first shield 31 is separated from the magnetic pole 30 along a first direction D1 aligned with the first surface 30F. In the example, the first direction D1 is aligned with the X-axis direction.

For example, the first shield 31 is separated from the magnetic pole 30 along the X-axis direction at the vicinity of the first surface 30F. For example, the magnetic pole 30 is separated from the second shield 32 along the X-axis direction at the vicinity of the first surface 30F. For example, a portion of the first shield 31 is separated from a portion of the magnetic pole 30 along the X-axis direction. For example, a portion of the magnetic pole 30 is separated from a portion of the second shield 32 along the X-axis direction. The magnetic head 110 and the magnetic recording medium 80 move relatively substantially along the X-axis direction. Thereby, information is recorded at any position of the magnetic recording medium 80.

The magnetic pole 30 is, for example, a main pole. The first shield 31 is, for example, a trailing shield. The first shield 31 can form a magnetic core with the magnetic pole 30. For example, an additional shield such as, for example, a not-illustrated side shield, etc., may be included.

As shown in FIG. 1B, the stacked body 20 includes a magnetic layer 25, a first conductive layer 21, and a second conductive layer 22.

The magnetic layer 25 includes at least one selected from the group consisting of Fe, Co, and Ni. The magnetic layer 25 is, for example, an FeCo layer, an FeNi layer, etc.

The first conductive layer 21 is provided between the magnetic pole 30 and the magnetic layer 25. The first conductive layer 21 contacts the magnetic pole 30 and the magnetic layer 25. The first conductive layer 21 is nonmagnetic. The first conductive layer 21 is, for example, a nonmagnetic metal layer.

The second conductive layer 22 is provided between the magnetic layer 25 and the first shield 31. The second conductive layer 22 contacts the magnetic layer 25 and the first shield 31. The second conductive layer 22 is nonmagnetic. The second conductive layer 22 is, for example, a nonmagnetic metal layer.

At least one of the first conductive layer 21 or the second conductive layer 22 includes at least one selected from the group consisting of Cu, Ag, Al, and Au. The first conductive layer 21 and the second conductive layer 22 are, for example, Cu layers.

One of the first conductive layer 21 or the second conductive layer 22 may include at least one selected from the group consisting of Ta, Pt, W, Ru, Mo, Ir, Rh, and Pd. For example, the first conductive layer or the second conductive layer includes Ta.

The first shield 31 has a first shield surface 31a. The first shield surface 31a opposes the second conductive layer 22. The first shield surface 31a contacts the second conductive layer 22.

In the example, the first shield surface 31a is tilted with respect to the first surface 30F (e.g., the X-Y plane). The recording magnetic field that is generated at the vicinity of the first surface 30F of the magnetic pole 30 can be strengthened. Stable high density recording is possible.

For example, a first interconnect W1 and a second interconnect W2 are provided in the magnetic head 110. These interconnects are configured to supply a current to the stacked body 20.

In the example, the first interconnect W1 is electrically connected to the magnetic pole 30. The second interconnect W2 is electrically connected to the first shield 31. The first interconnect W1 may be electrically connected to the first conductive layer 21. The second interconnect W2 may be electrically connected to the second conductive layer 22. The first interconnect W1 and the second interconnect W2 are electrically connected to a first electrical circuit 20D. The first electrical circuit 20D is configured to supply the current to the stacked body 20.

For example, the current has an orientation from the second conductive layer 22 toward the first conductive layer 21. When the current is supplied, an electron current flows from the first conductive layer 21 toward the second conductive layer 22. The current may have an orientation from the first conductive layer toward the second conductive layer.

A thickness tm of the magnetic layer 25 is, for example, not less than 4 nm (nanometers) and not more than 20 nm. A thickness t1 of the first conductive layer 21 is, for example, not less than 0.5 nm and not more than 10 nm. A thickness t2 of the second conductive layer 22 is, for example, not less than 0.5 nm and not more than 10 nm. These thicknesses are lengths along the stacking direction of the stacked body 20. For example, the stacking direction is perpendicular to the first shield surface 31a.

The magnetic pole 30 includes a first portion P1 overlapping the stacked body 20 in the first direction D1 (the X-axis direction). On the other hand, the first shield 31 includes a second portion P2 overlapping the stacked body 20 in the first direction D1. The distance along the first direction D1 between the first portion P1 and the second portion P2 corresponds to a write gap WG. The write gap WG corresponds to the distance between the first portion P1 and the second portion P2 when viewed along arrow AF.

A direction perpendicular to the first surface 30F is taken as a second direction D2. The second direction D2 is the Z-axis direction (e.g., the height direction). A direction perpendicular to the first direction D1 and perpendicular to the second direction D2 is taken as a third direction D3. The third direction D3 is the Y-axis direction (e.g., the cross-track direction).

The length of the magnetic layer 25 along the second direction D2 is taken as a magnetic layer height hm. The length of the first shield surface 31a along the second direction D2 is taken as a first shield surface height hs.

The first conductive layer 21, the second conductive layer 22, and the insulating portions are not illustrated in FIG. 2. As shown in FIG. 2, the length of the magnetic layer 25 along the third direction D3 (the Y-axis direction) is taken as a magnetic layer width Wm. The length of the magnetic pole along the third direction D3 is taken as a magnetic pole width Wp. As described above, the third direction D3 is perpendicular to the first direction D1 (the X-axis direction) and perpendicular to the second direction D2 (the Z-axis direction).

As described above, interconnects (e.g., the first interconnect W1 and the second interconnect W2) that are configured to supply, to the stacked body 20, a current having an orientation from the second conductive layer 22 toward the first conductive layer 21 or a current having an orientation from the first conductive layer 21 toward the second conductive layer 22 can be provided in the magnetic head 110. As described below, by causing the current to flow in the stacked body 20, it is easy to effectively apply, to the magnetic recording medium 80, a magnetic field (a recording magnetic field) generated from the magnetic pole 30.

Figure 3:
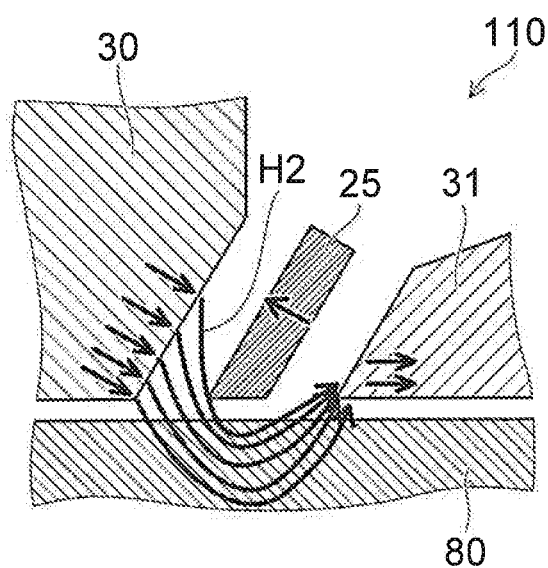
FIG. 3 is a schematic view illustrating the operation of the magnetic head according to the first embodiment.

FIG. 3 is a schematic view illustrating the operation of the magnetic head according to the first embodiment.

The magnetic field from the magnetic pole 30 toward the first shield 31 is generated by causing the recording current to flow in the coil 30c. In a first reference example in which the stacked body 20 is not provided, a portion of the magnetic field emitted from the magnetic pole 30 directly enters the first shield 31 without being oriented toward the magnetic recording medium 80. Therefore, the magnetic field is not easily applied to the magnetic recording medium 80. Such a phenomenon is more pronounced when reducing the write gap to increase the resolution. On the other hand, in the magnetic head 110 as shown in FIG. 3, by causing the current to flow in the stacked body 20, the magnetization of the magnetic layer 25 has a component in the reverse orientation of the orientation of a magnetic field H2 emitted from the magnetic pole 30. Therefore, the magnetic field H2 that is emitted from the magnetic pole 30 does not easily pass through the magnetic layer 25. Much of the magnetic field H2 passes through the magnetic recording medium 80 and enters the first shield 31. Therefore, the magnetic field H2 easily is applied to the magnetic recording medium 80. The magnetic field H2 is applied to the magnetic recording medium 80 even in the case where the write gap is set to be small.

Thus, in the embodiment, even in the case where the write gap is set to be small, the magnetic field H2 that is emitted from the magnetic pole 30 and is oriented directly toward the first shield 31 is suppressed. As a result, much of the magnetic field H2 that is emitted from the magnetic pole 30 is oriented toward the magnetic recording medium 80; and an effective recording magnetic field is applied to the magnetic recording medium 80. Thereby, it is possible to increase the recording density.

On the other hand, there is a second reference example in which a spin torque oscillator (STO) is provided between the magnetic pole 30 and the first shield 31. The STO includes two magnetic layers, and a nonmagnetic layer provided between the two magnetic layers. The high frequency magnetic field that is generated from the STO is applied to the magnetic recording medium 80; and local recording is easy by inducing the ferromagnetic resonance phenomenon of the magnetization of the magnetic recording medium 80. Microwave-assisted magnetic recording (MAMR) is performed by using this effect.

Conversely, in the embodiment, the stacked body 20 that is provided between the magnetic pole 30 and the first shield 31 includes one magnetic layer 25. In the embodiment, the high frequency magnetic field that is generated from the stacked body 20 is not utilized. In the embodiment, the magnetic field H2 that is emitted from the magnetic pole 30 is effectively oriented toward the magnetic recording medium 80 by utilizing the magnetization of the magnetic layer 25 of the stacked body 20.

In the embodiment, for example, the magnetization of the magnetic layer 25 has a component in the reverse orientation of the magnetic field H2 generated from the magnetic pole 30 due to the spin torque due to the current flowing through the stacked body 20.

In the magnetic head 110 according to the embodiment, for example, a first ratio (hm/hs) of the magnetic layer height hm to the first shield surface height hs is 0.1 or more. Thereby, as described below, a magnetic head can be provided in which it is possible to increase the recording density.

Simulation results of characteristics of the magnetic head will now be described.

In the simulation (a magnetostatic field simulation using a finite element method), the characteristics of the magnetic head are determined when changing the first shield surface height hs, the magnetic pole width Wp, the write gap WG, the magnetic layer height hm, and the magnetic layer width Wm recited above. In the simulation, the first shield surface height hs is set to 20 nm, 40 nm, or 60 nm. The magnetic pole width Wp is set to 40 nm or 60 nm. The write gap WG is set to 15 nm, 18 nm, or 20 nm. The magnetic layer height hm is set to 1 nm, 5 nm, 10 nm, 15 nm, 20 nm, 30 nm, 40 nm, 60 nm, 80 nm, or 100 nm. The magnetic layer width Wm is set to 10 nm, 20 nm, 30 nm, 40 nm, 50 nm, 60 nm, 80 nm, or 100 nm.

In the simulation, the magnetic field distribution that is applied from the magnetic head to the magnetic recording medium 80 when modifying these various parameters is calculated.

Figure 4A:
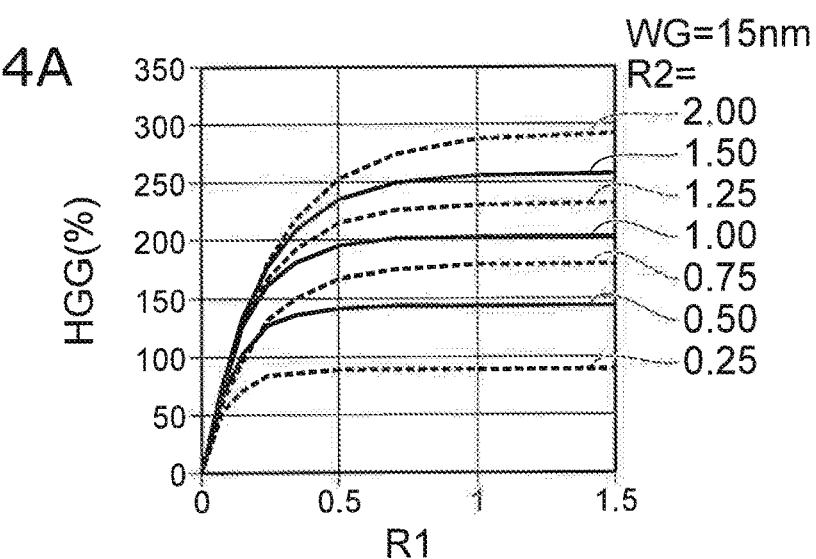
FIG. 4A to FIG. 4C are graphs illustrating characteristics of the magnetic head.
Figure 4B:
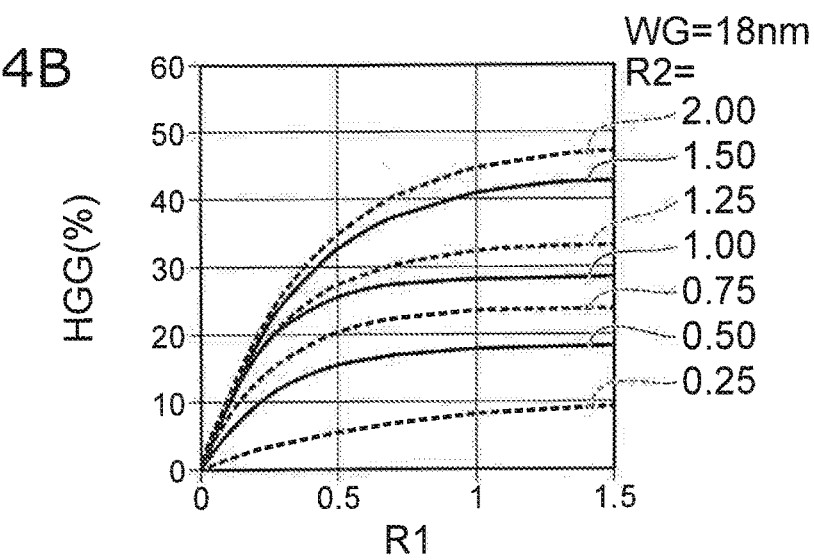
Figure 4C:
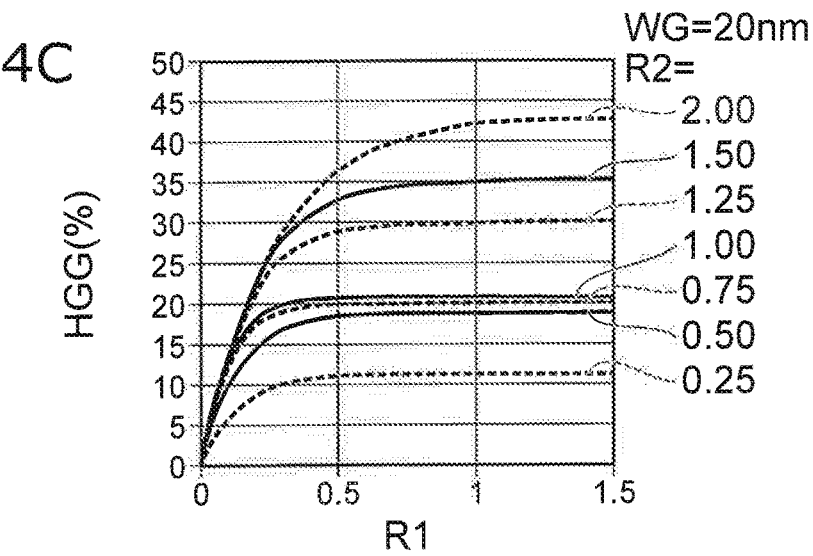

FIG. 4A to FIG. 4C are graphs illustrating characteristics of the magnetic head.

FIG. 4A, FIG. 4B, and FIG. 4C correspond respectively to write gaps WG of 15 nm, 18 nm, and 20 nm. In these figures, the horizontal axis is the first ratio R1. The first ratio R1 is the ratio (hm/hs) of the magnetic layer height hm to the first shield surface height hs. As described above, the magnetic layer height hm is the length of the magnetic layer 25 along the second direction D2 (the Z-axis direction). The first shield surface height hs is the length of the first shield surface 31a along the second direction D2. The vertical axis is a gain HGG (%) of the magnetic field gradient. The magnetic field gradient is the change rate of the spatial effective magnetic field strength of the magnetic field distribution along the first direction D1 at the on-track position (e.g., the center position of the magnetic pole width Wp). In the example, the magnetic field gradient is calculated as the spatial change rate of the effective magnetic field strength at the write gap WG vicinity when the effective magnetic field strength is 10 kOe. The gain HGG is the improvement rate of the magnetic field gradient of the magnetic head 110 including the magnetic layer 25 with respect to the magnetic field gradient of the magnetic head in which the magnetic layer 25 is not inserted but otherwise has a similar structure. In the simulation, the magnetization of the magnetic layer 25 of the magnetic head 110 is aligned with the direction of the thickness tm of the magnetic layer 25. The magnetization of the magnetic layer 25 has a component in the reverse direction of the magnetic field (the gap magnetic field) from the magnetic pole 30 toward the first shield 31 via the write gap WG of the case where the magnetic layer 25 is not provided. When the value of the gain HGG is large, the characteristics as the magnetic head improve; and high density recording is possible. It is favorable for the gain HGG to be high.

In these figures, the values when a second ratio R2 has various values are shown. The second ratio R2 is the ratio (Wm/Wp) of the magnetic layer width Wm to the magnetic pole width Wp. As described above, the magnetic layer width Wm is the length of the magnetic layer 25 along the third direction D3 (the Y-axis direction). The magnetic pole width Wp is the length of the magnetic pole 30 along the third direction D3.

It can be seen from FIG. 4A to FIG. 4C that the gain HGG is low when the first ratio R1 (hm/hs) is low. The gain HGG becomes high when the first ratio R1 is high. The gain HGG abruptly starts to increase when the first ratio R1 becomes about 0.1 or more. Accordingly, it is favorable for the first ratio R1 to be 0.1 or more. Thereby, a high gain HGG is obtained. The improvement of the gain HGG has a trend of saturating when the first ratio R1 exceeds 1.

Figure 5A:
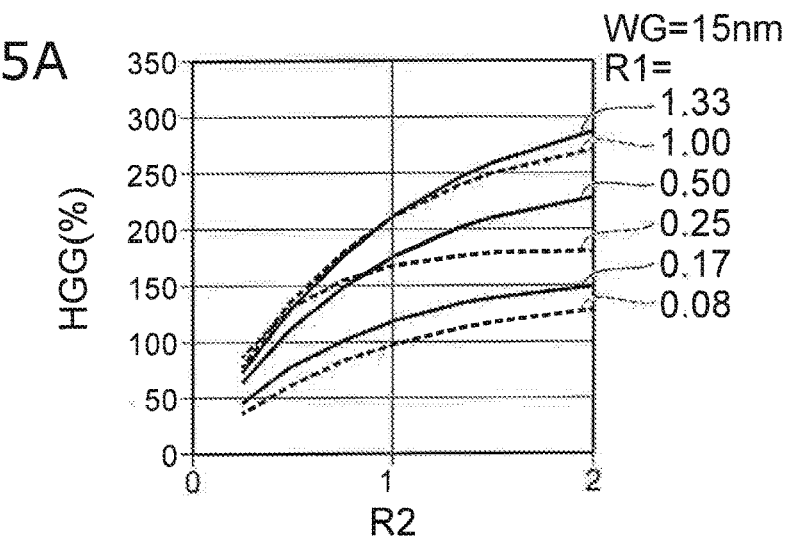
FIG. 5A to FIG. 5C are graphs illustrating the characteristics of the magnetic head.
Figure 5B:
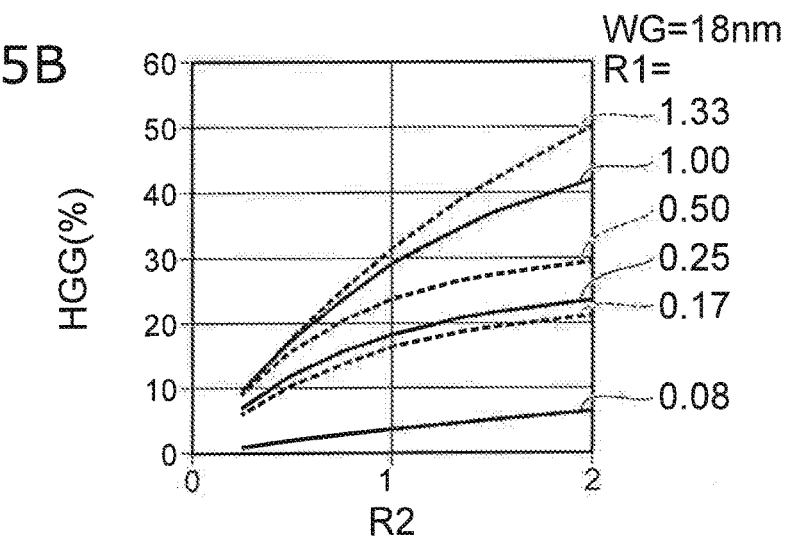
Figure 5C:
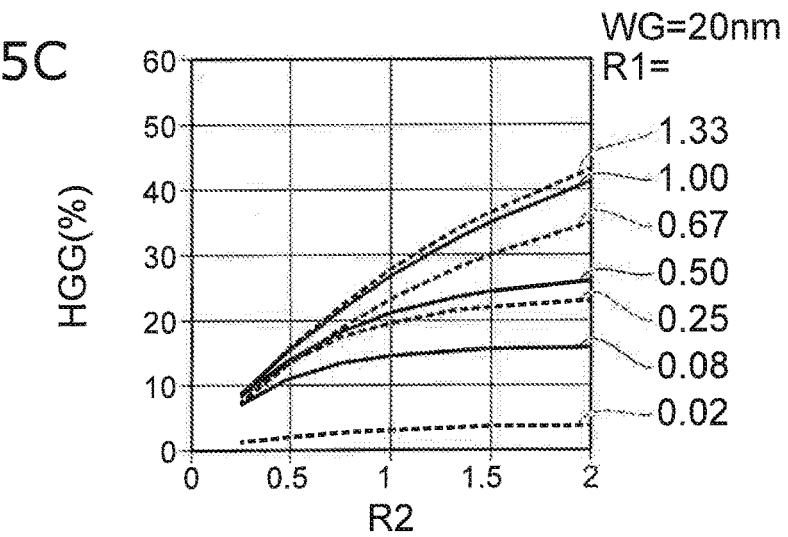

FIG. 5A to FIG. 5C are graphs illustrating the characteristics of the magnetic head.

FIG. 5A, FIG. 5B, and FIG. 5C correspond respectively to write gaps WG of 15 nm, 18 nm, and 20 nm. In these figures, the horizontal axis is the second ratio R2. The vertical axis is the gain HGG (%). In these figures, the values when the first ratio R1 has various values are shown.

It can be seen from these figures that the gain HGG increases as the second ratio R2 increases. The increase of the gain HGG is distinct when the second ratio R2 is 0.5 or more. The trend of the improvement of the gain HGG continues even in the region where the second ratio R2 is greater than 1.

Figure 6A:
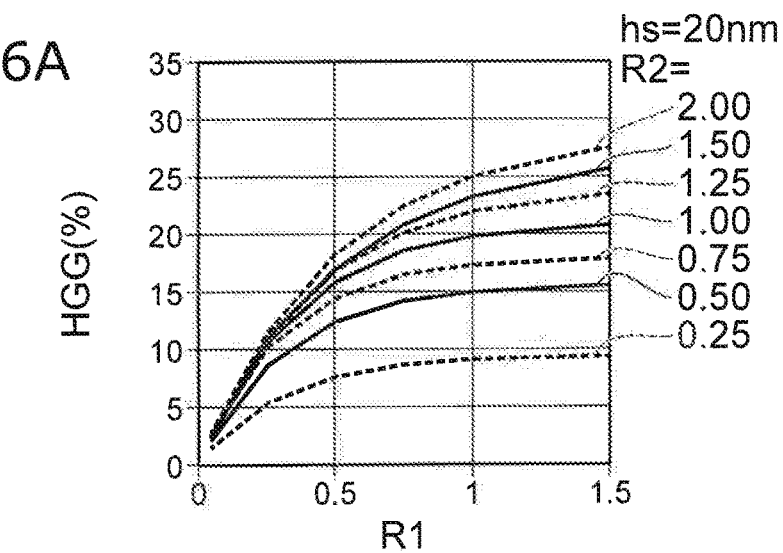
FIG. 6A to FIG. 6C are graphs illustrating the characteristics of the magnetic head.
Figure 6B:
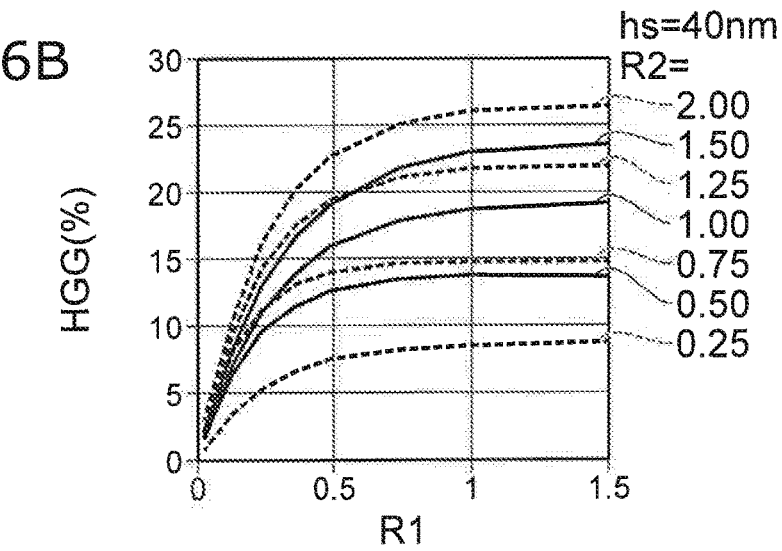
Figure 6C:
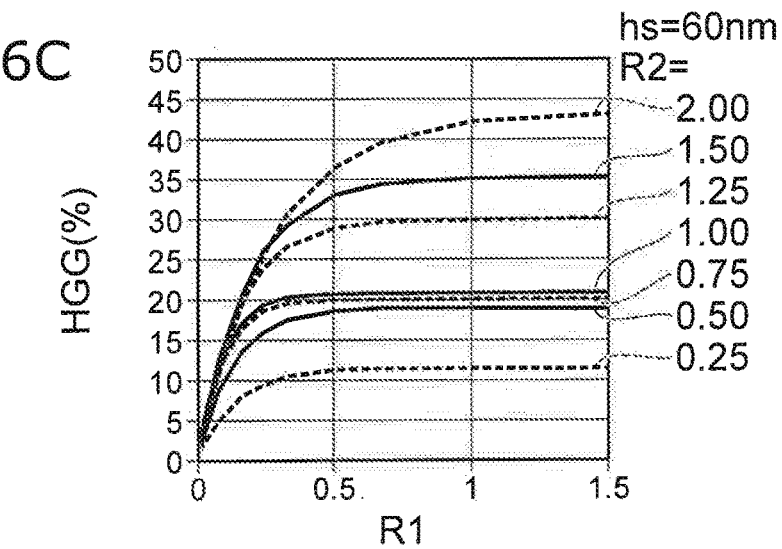

FIG. 6A to FIG. 6C are graphs illustrating the characteristics of the magnetic head.

FIG. 6A, FIG. 6B, and FIG. 6C correspond respectively to first shield surface heights hs of 20 nm, 40 nm, and 60 nm. In these figures, the horizontal axis is the first ratio R1. The vertical axis is the gain HGG (%). In these figures, the values when the second ratio R2 has various values are shown.

It can be seen from these figures that the gain HGG increases as the first ratio R1 (hm/hs) increases. The gain HGG starts to increase when the first ratio R1 becomes about 0.1 or more. Accordingly, it is favorable for the first ratio R1 to be 0.1 or more. Thereby, a high gain HGG is obtained. The improvement of the gain HGG has a trend of saturating when the first ratio R1 exceeds 1.

Figure 7A:
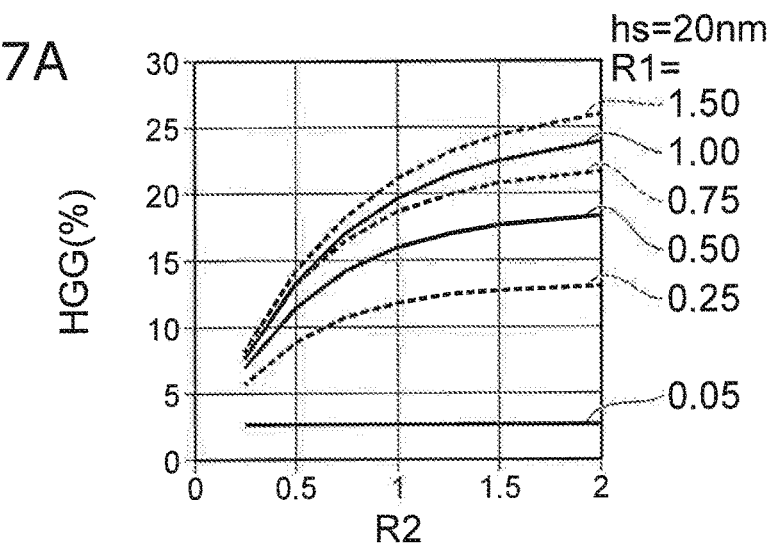
FIG. 7A to FIG. 7C are graphs illustrating the characteristics of the magnetic head.
Figure 7B:
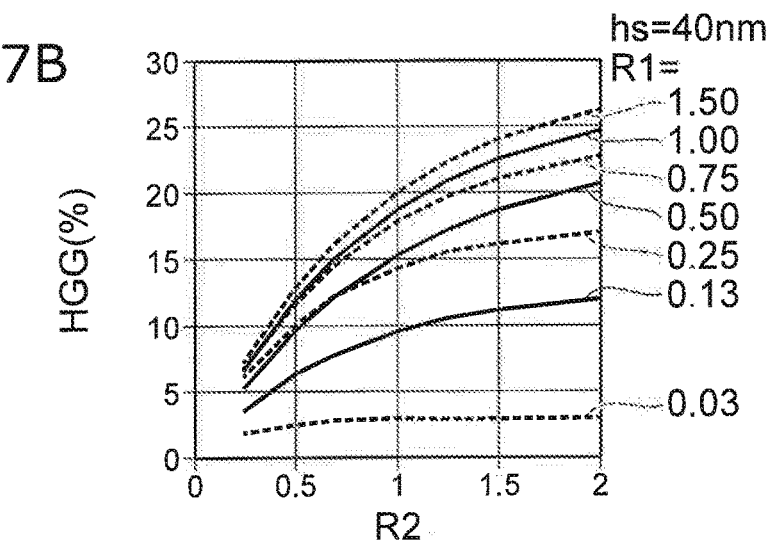
Figure 7C:
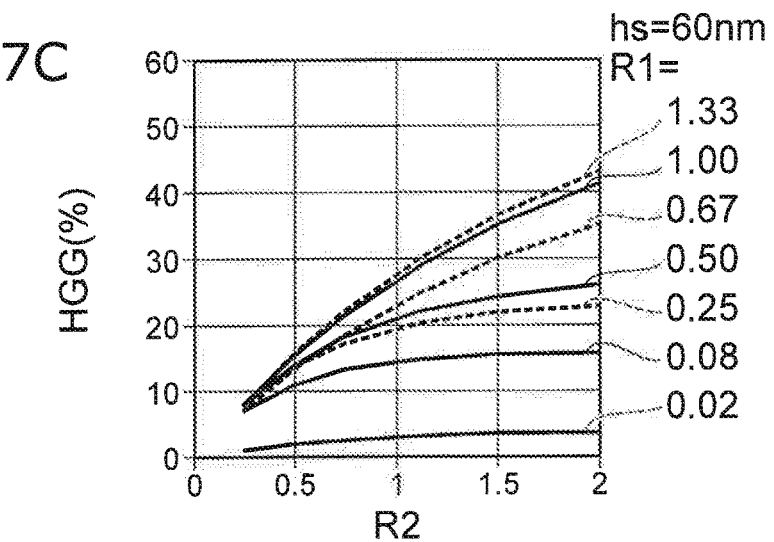

FIG. 7A to FIG. 7C are graphs illustrating the characteristics of the magnetic head.

FIG. 7A, FIG. 7B, and FIG. 7C correspond respectively to first shield surface heights hs of 20 nm, 40 nm, and 60 nm. In these figures, the horizontal axis is the second ratio R2. The vertical axis is the gain HGG (%). In these figures, the values when the first ratio R1 has various values are shown.

It can be seen from these figures that the gain HGG increases as the second ratio R2 increases. The increase of the gain HGG is distinct when the second ratio R2 is 0.5 or more. The trend of the improvement of the gain HGG continues even in the region where the second ratio R2 is greater than 1.

Figure 8A:
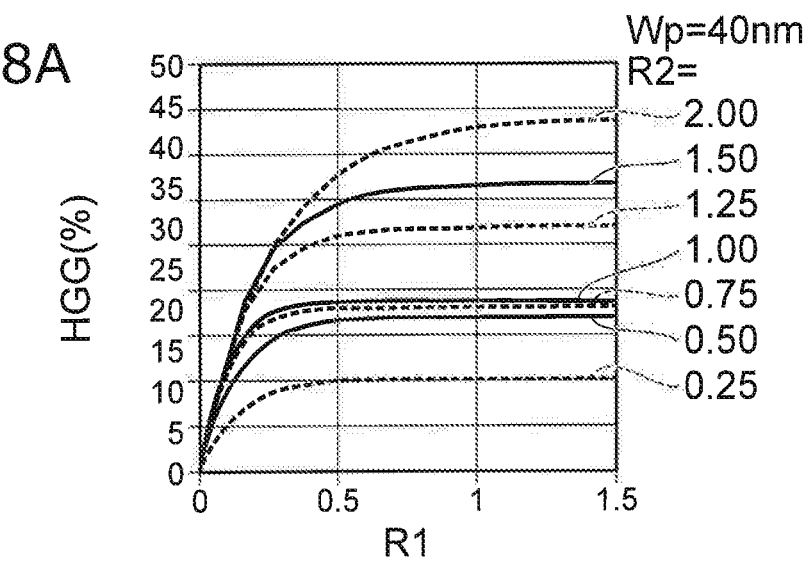
FIG. 8A and FIG. 8B are graphs illustrating the characteristics of the magnetic head.
Figure 8B:
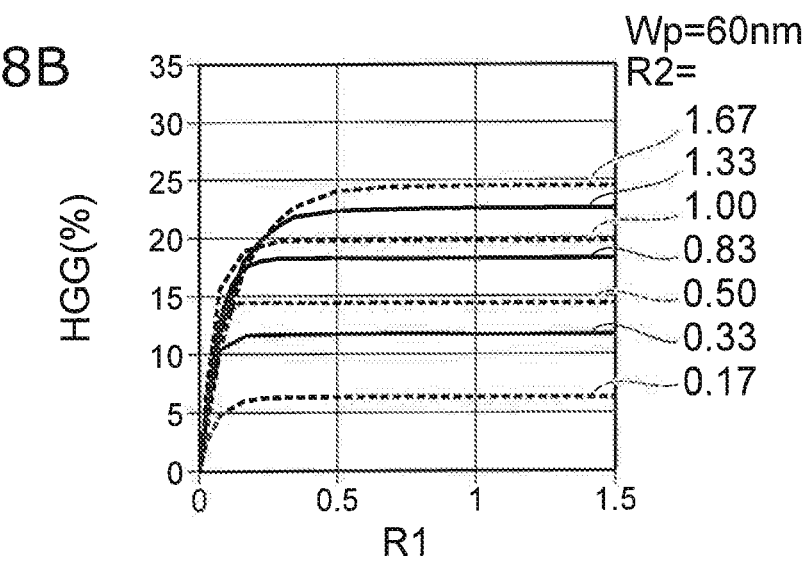

FIG. 8A and FIG. 8B are graphs illustrating the characteristics of the magnetic head.

FIG. 8A and FIG. 8B correspond respectively to magnetic pole widths Wp of 40 nm and 60 nm. In these figures, the horizontal axis is the first ratio R1. The vertical axis is the gain HGG (%). In these figures, the values when the second ratio R2 has various values are shown.

It can be seen from these figures that the gain HGG increases as the first ratio R1 (hm/hs) increases. The gain HGG starts to increase when the first ratio R1 becomes about 0.1 or more. Accordingly, it is favorable for the first ratio R1 to be 0.1 or more. Thereby, a high gain HGG is obtained. The improvement of the gain HGG has a trend of substantially saturating when the first ratio R1 exceeds 1.

FIG. 9A and FIG. 9B are graphs illustrating the characteristics of the magnetic head.

FIG. 9A and FIG. 9B correspond respectively to magnetic pole widths Wp of 40 nm and 60 nm. In these figures, the horizontal axis is the second ratio R2. The vertical axis is the gain HGG (%). In these figures, the values when the first ratio R1 has various values are shown.

It can be seen from these figures that the gain HGG increases as the second ratio R2 increases. The increase of the gain HGG is distinct when the second ratio R2 is 0.5 or more. The trend of the improvement of the gain HGG continues even in the region where the second ratio R2 is greater than 1.

From the results recited above, it is favorable for the first ratio R1 to be 0.05 or more in the embodiment. Thereby, the gain HGG is obtained. The first ratio R1 is, for example, 1.5 or less.

In the embodiment, it is more favorable for the first ratio R1 to be 0.10 or more. It is more favorable for the first ratio R1 to be 0.5 or more. The gain HGG can be increased by setting the first ratio R1 to be high.

In the embodiment, the first ratio R1 may be 1.0 or less.

On the other hand, it is favorable for the second ratio R2 to be 0.5 or more. Thereby, a high gain HGG is obtained. The second ratio R2 is, for example, 1.5 or less.

The magnetic pole width Wp (the length of the magnetic pole 30 along the third direction D3 (the Y-axis direction)) is, for example, not less than 20 nm and not more than 60 nm.

The magnetic layer width Wm (the length of the magnetic layer 25 along the third direction D3 (the Y-axis direction)) is, for example, not less than 10 nm and not more than 100 nm.

The first shield surface height hs (the length of the first shield surface 31a along the second direction D2 (the Z-axis direction)) is, for example, not less than 20 nm and not more than 80 nm.

The magnetic layer height hm (the length of the magnetic layer 25 along the second direction D2 (the Z-axis direction)) is, for example, not less than 1 nm and not more than 100 nm.

The write gap WG (the distance between the magnetic pole 30 and the first shield 31 along the first direction (the X-axis direction)) is, for example, not less than 15 nm and not more than 20 nm.

FIG. 10A, FIG. 10B, FIG. 11A, and FIG. 11B are graphs illustrating the characteristics of the magnetic head.

A magnetization reversal rate MRR of the magnetic layer 25 when changing the first shield surface height hs, the magnetic pole width Wp, the write gap WG, the magnetic layer height hm, and the magnetic layer width Wm recited above can be calculated using a LLG simulation. The results are shown in these figures. In all of the simulations, the saturation magnetization of the magnetic layer 25 is 1.0 T; and the thickness tm is 10 nm. The current density of the magnetic layer 25 is $5.5 \times 10^8$ A/cm$^2$.

Figure 10A:
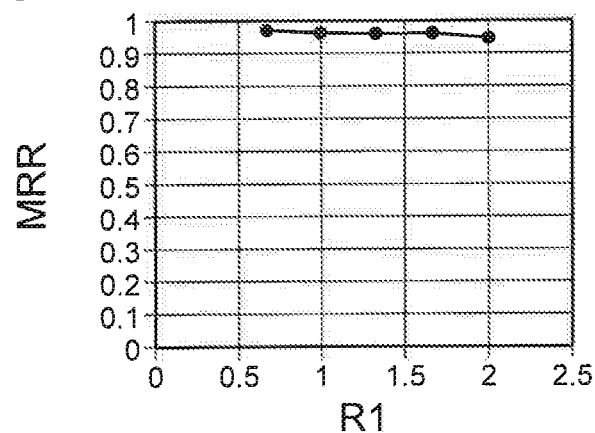
FIG. 10A and FIG. 10B are graphs illustrating the characteristics of the magnetic head.
Figure 10B:
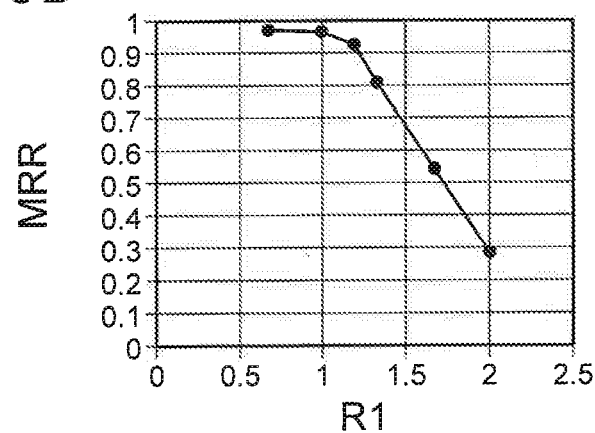

In FIG. 10A and FIG. 10B, the horizontal axis is the first ratio R1. The vertical axis is the magnetization reversal rate MRR of the magnetic layer 25. The magnetization of the magnetic layer 25 has a large antiparallel component for the gap magnetic field as the magnetization reversal rate MRR approaches "1."

In FIG. 10A, the current has an orientation from the first conductive layer 21 toward the second conductive layer 22.

At this time, Ta is assumed as the material of the second conductive layer 22. In such a case as shown in FIG. 10A, a high magnetization reversal rate MRR is obtained regardless of the first ratio R1.

In FIG. 10B, the current has an orientation from the second conductive layer 22 toward the first conductive layer 21. At this time, Ta is assumed as the material of the first conductive layer 21. In such a case as shown in FIG. 10B, the magnetization reversal rate MRR degrades abruptly when the first ratio R1 exceeds 1.2. Therefore, it is favorable for the first ratio R1 to be 1.2 or less.

Figure 11A:
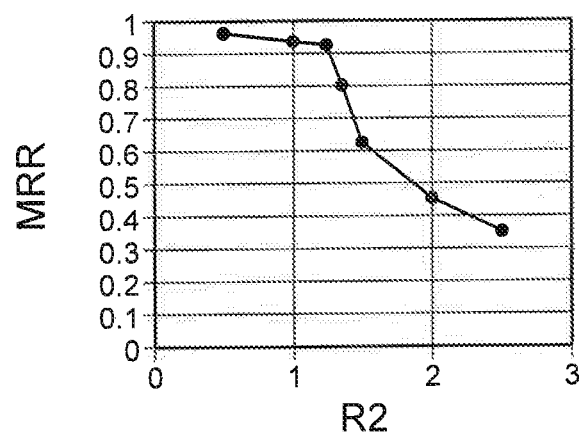
FIG. 11A and FIG. 11B are graphs illustrating the characteristics of the magnetic head.
Figure 11B:
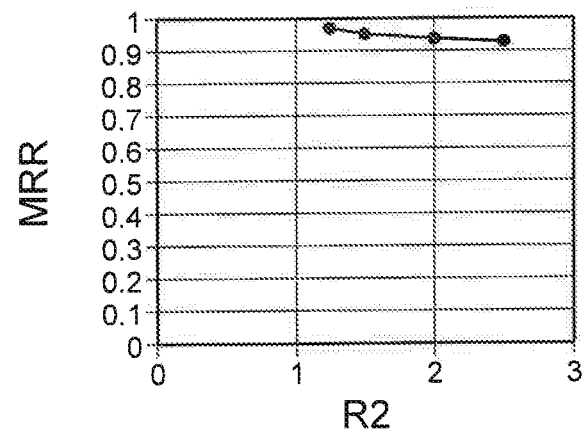

In FIG. 11A and FIG. 11B, the horizontal axis is the second ratio R2. The vertical axis is the magnetization reversal rate MRR of the magnetic layer 25.

In FIG. 11A, the current has an orientation from the first conductive layer 21 toward the second conductive layer 22. At this time, Ta is assumed as the material of the second conductive layer 22. In such a case, as shown in FIG. 11A, the magnetization reversal rate MRR degrades abruptly when the second ratio R2 exceeds 1.3. Therefore, it is favorable for the second ratio R2 to be 1.3 or less.

In FIG. 11B, the current has an orientation from the second conductive layer 22 toward the first conductive layer 21. At this time, Ta is assumed as the material of the first conductive layer 21. In such a case as shown in FIG. 11B, the abrupt degradation of the magnetization reversal rate MRR is not seen for the second ratio R2.

For example, in the case where the first conductive layer 21 includes at least one selected from the group consisting of Ta, Pt, W, Ru, Mo, Ir, Rh, and Pd, the dependence of the magnetization reversal rate MRR on the first ratio R1 or the dependence of the magnetization reversal rate MRR on the second ratio R2 is different depending on the orientation of the current. For example, in the case where the second conductive layer 22 includes at least one selected from the group consisting of Ta, Pt, W, Ru, Mo, Ir, Rh, and Pd, the dependence of the magnetization reversal rate MRR on the first ratio R1 or the dependence of the magnetization reversal rate MRR on the second ratio R2 is different depending on the orientation of the current.

One of the first conductive layer 21 or the second conductive layer 22 includes, for example, at least one selected from the group consisting of Ta, Pt, W, Ru, Mo, Ir, Rh, and Pd. For example, the spin diffusion length is small for these materials. By using such a material, the magnetization reversal efficiency (e.g., the magnetization reversal rate MRR) of the magnetic layer 25 can be increased.

In the case where Ta is included in the first conductive layer 21, for example, it is considered that the spin-transfer torque acting on the magnetic layer 25 at the interface of the magnetic layer 25 and the first conductive layer 21 can be suppressed. In the case where Ta is included in the second conductive layer 22, for example, it is considered that the spin-transfer torque acting on the magnetic layer 25 at the interface between the magnetic layer 25 and the second conductive layer 22 can be suppressed.

An example of an operation of the magnetic head 110 according to the embodiment will now be described.

Figure 12:
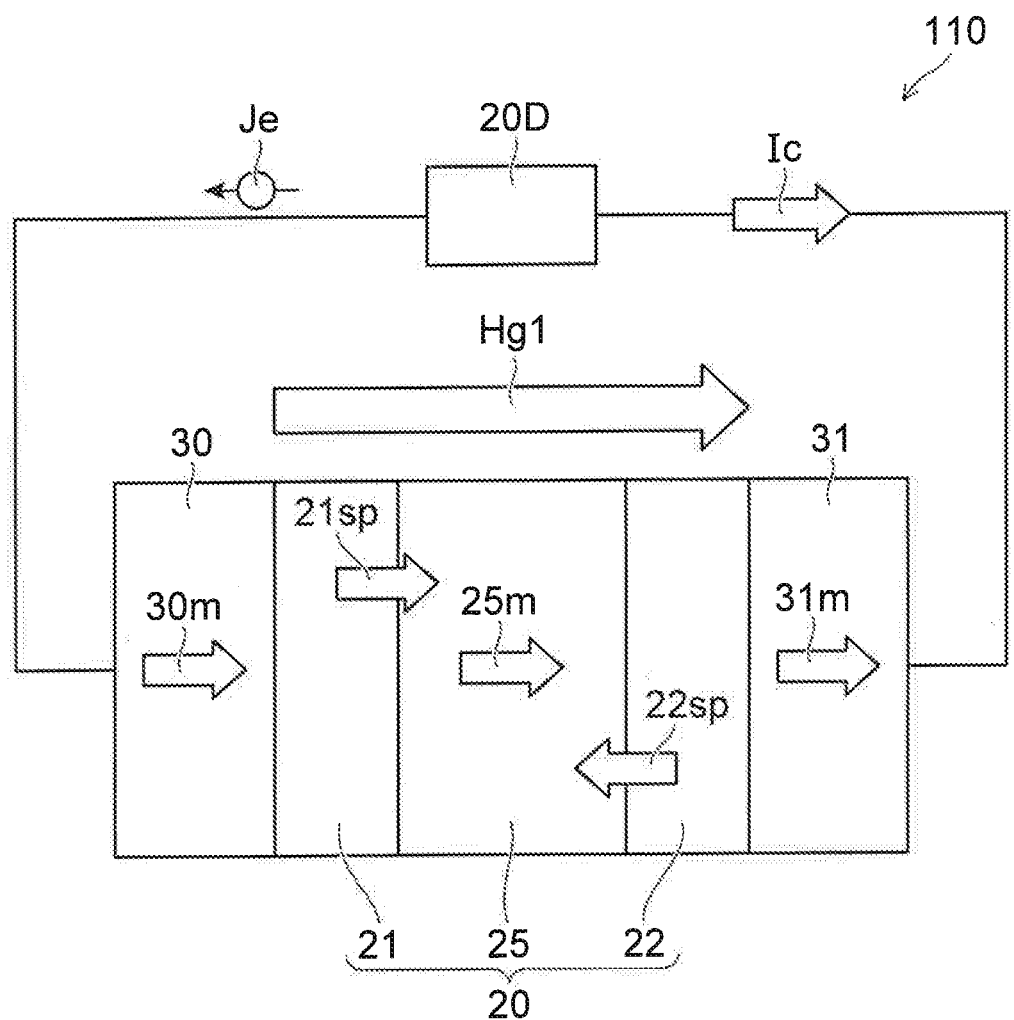
FIG. 12 is a schematic view illustrating the operation of the magnetic head according to the embodiment.

FIG. 12 is a schematic view illustrating the operation of the magnetic head according to the embodiment.

As shown in FIG. 12, the stacked body 20 is provided between the magnetic pole 30 and the first shield 31. The magnetic layer 25, the first conductive layer 21, and the second conductive layer 22 are provided in the stacked body 20.

A recording current is supplied from the second electrical circuit 30D (referring to FIG. 1A) to the coil 30c of the magnetic pole 30. Thereby, a gap magnetic field Hg1 is generated from the magnetic pole 30. The gap magnetic field Hg1 is applied to the stacked body 20.

For example, a magnetization 30m of the magnetic pole 30 and a magnetization 31m of the first shield 31 are substantially parallel to the gap magnetic field Hg1. A magnetization 25m of the magnetic layer 25 is substantially parallel to the gap magnetic field Hg1.

At this time, a current Ic is supplied from the first electrical circuit 20D to the stacked body 20. In the example, the current Ic is supplied to the stacked body 20 via the first shield 31 and the magnetic pole 30. For example, the current Ic flows from the second conductive layer 22 toward the first conductive layer 21. An electron current Je flows at this time. The electron current Je flows from the first conductive layer 21 toward the second conductive layer 22.

Spin torque 21sp is generated by the electron current Je at the interface between the first conductive layer 21 and the magnetic layer 25. The spin torque 21sp is transmissive. On the other hand, spin torque 22sp is generated by the electron current Je at the interface between the magnetic layer 25 and the second conductive layer 22. The spin torque 22sp is reflective. The magnetization 25m of the magnetic layer 25 is reversed by these spin torques. The reversed magnetization 25m has a component that is antiparallel to the gap magnetic field Hg1 shown in FIG. 12.

For example, the current Ic may flow from the first conductive layer toward the second conductive layer. At this time, the orientation of the spin torque 21sp and the orientation of the spin torque 22sp shown in FIG. 12 are reversed. The spin torque 21sp is reflective; and the spin torque 22sp is transmissive.

Thus, in the embodiment, the magnetization 25m of the magnetic layer 25 has an orientation that is the reverse of the magnetic field (the gap magnetic field Hg1) generated from the magnetic pole 30 in the case where the current Ic is not caused to flow in the magnetic layer 25. By such a magnetization 25m, the magnetic field that is generated from the magnetic pole 30 can be applied effectively to the magnetic recording medium 80.

In the embodiment, for example, when the current Ic is caused to flow between the first conductive layer 21 and the second conductive layer 22 (e.g., between the magnetic pole 30 and the first shield 31), the magnetization 25m of the magnetic layer 25 has a component in the reverse direction of the magnetic field (the gap magnetic field Hg1) generated from the magnetic pole 30 in the case where the current Ic is not caused to flow.

For example, in the embodiment, the electrical resistance between the magnetic pole 30 and the second conductive layer 22 when a first current (which may be the current Ic) is caused to flow between the first conductive layer 21 and the second conductive layer 22 is different from the electrical resistance between the magnetic pole 30 and the second conductive layer 22 when the first current is not caused to flow between the first conductive layer 21 and the second conductive layer 22.

For example, in the embodiment, the electrical resistance between the first shield 31 and the first conductive layer 21 when the first current is caused to flow between the first conductive layer 21 and the second conductive layer 22 is different from the electrical resistance between the first shield 31 and the first conductive layer 21 when the first current is not caused to flow between the first conductive layer 21 and the second conductive layer 22.

For example, the electrical resistance of the stacked body 20 when the first current is caused to flow between the magnetic pole 30 and the first shield 31 via the first conductive layer 21, the magnetic layer 25, and the second conductive layer 22 is different from the electrical resistance of the stacked body 20 when the first current is not caused to flow.

For example, the electrical resistance difference recited above is based on the magnetoresistance effect.

An example of a magnetic recording and reproducing device according to the embodiment will now be described.

Figure 13:
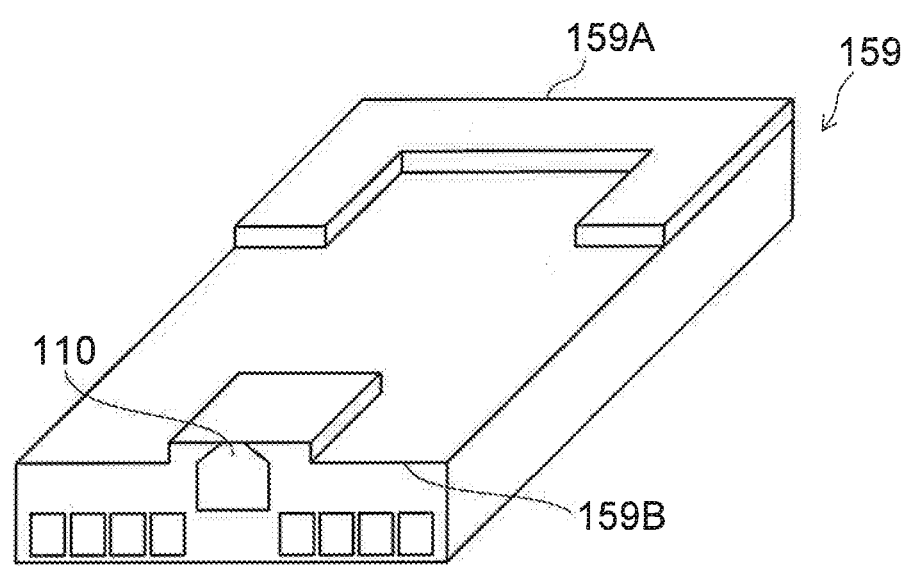
FIG. 13 is a schematic perspective view illustrating a portion of a magnetic recording and reproducing device according to the embodiment.

FIG. 13 is a schematic perspective view illustrating a portion of the magnetic recording and reproducing device according to the embodiment.

FIG. 13 illustrates a head slider.

A head slider 159 is provided in the magnetic head 110. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 14:
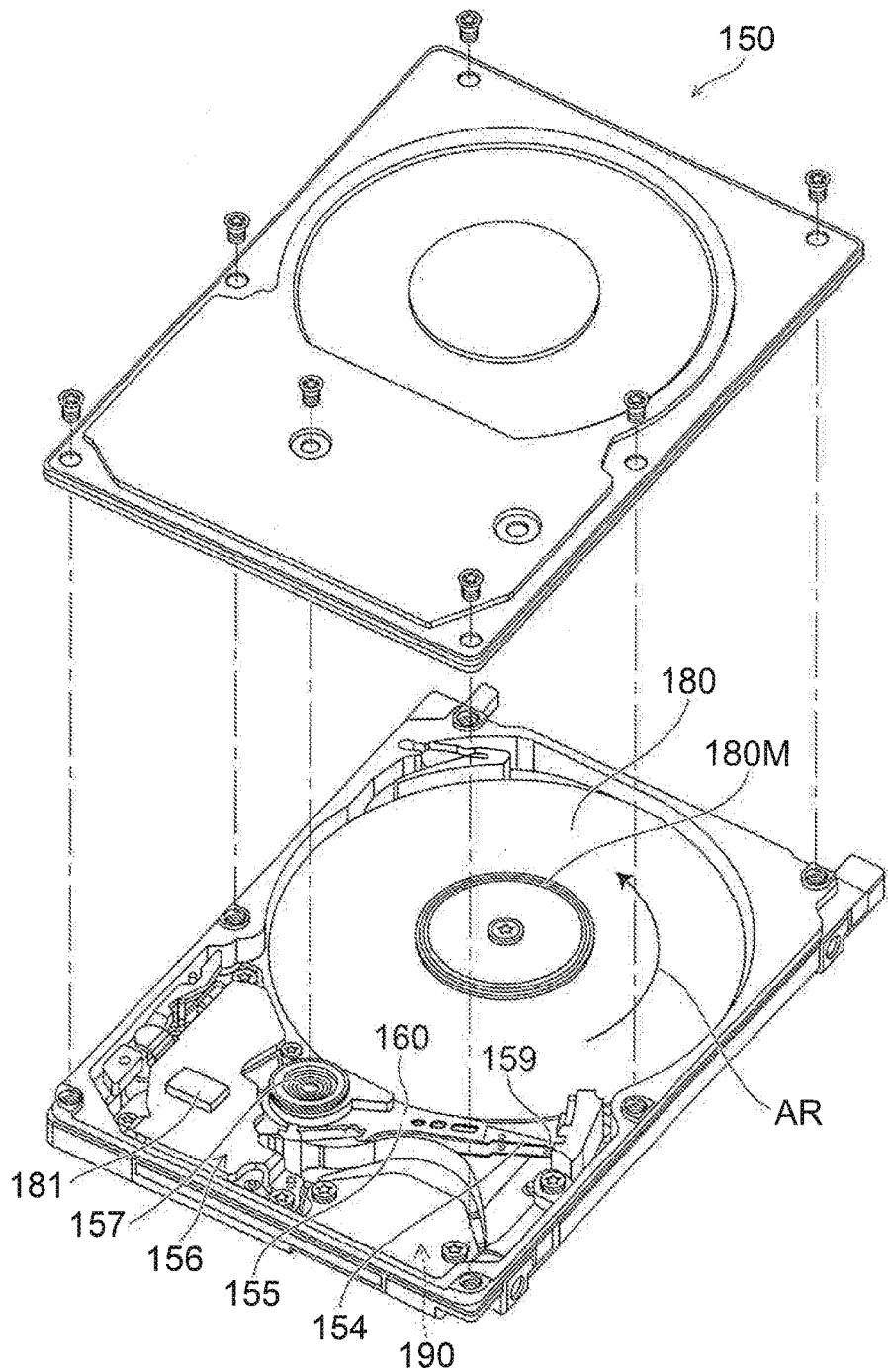
FIG. 14 is a schematic perspective view illustrating the magnetic recording and reproducing device according to the embodiment.

FIG. 14 is a schematic perspective view illustrating the magnetic recording and reproducing device according to the embodiment.

Figure 15A:
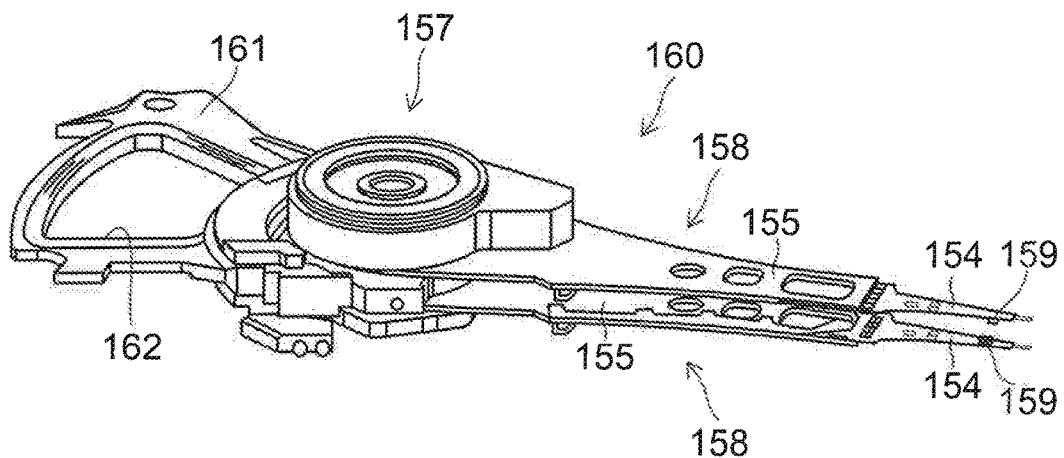
FIG. 15A and FIG. 15B are schematic perspective views illustrating a portion of the magnetic recording and reproducing device according to the embodiment.
Figure 15B:
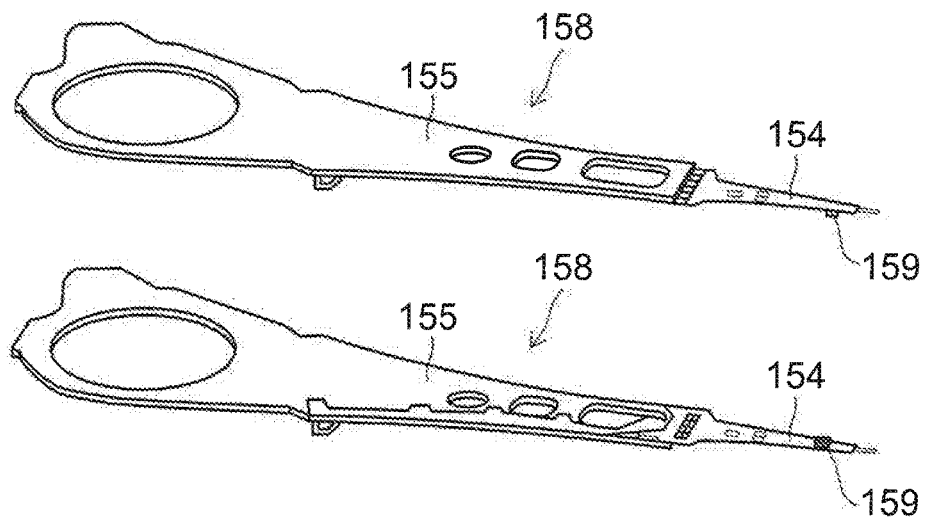

FIG. 15A and FIG. 15B are schematic perspective views illustrating a portion of the magnetic recording and reproducing device according to the embodiment.

As shown in FIG. 14, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 15A illustrates the configuration of a portion of the magnetic recording and reproducing device and is an enlarged perspective view of a head stack assembly 160.

FIG. 15B is a perspective view illustrating a magnetic head assembly (a head gimbal assembly (HGA)) 158 that is a portion of the head stack assembly 160.

As shown in FIG. 15A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 15B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) that are for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. In the signal processor 190, for example, the input/output lines of the signal processor 190 are electrically connected to the magnetic head by being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

The embodiments may include the following configurations (technological proposals).

Configuration 1

A magnetic head, comprising:
a magnetic pole having a first surface;
a first shield separated from the magnetic pole along a first direction aligned with the first surface; and
a stacked body provided between the magnetic pole and the first shield,
the stacked body including
a magnetic layer including at least one selected from the group consisting of Fe, Co, and Ni,
a first conductive layer contacting the magnetic pole and the magnetic layer, being provided between the magnetic pole and the magnetic layer, and being nonmagnetic, and
a second conductive layer contacting the magnetic layer and the first shield, being provided between the magnetic layer and the first shield, and being nonmagnetic,
the first shield having a first shield surface contacting the second conductive layer,
a first ratio of a length of the magnetic layer along a second direction to a length of the first shield surface along the second direction being 0.1 or more, the second direction being perpendicular to the first surface.

Configuration 2

The magnetic head according to Configuration 1, wherein a second ratio of a length of the magnetic layer along a third direction to a length of the magnetic pole along the third direction is 0.5 or more, the third direction being perpendicular to the first direction and perpendicular to the second direction.

Configuration 3

The magnetic head according to Configuration 1 or 2, wherein the first ratio is 1.2 or less.

Configuration 4

The magnetic head according to any one of Configurations 1 to 3, wherein the first conductive layer includes at least one selected from the group consisting of Ta, Pt, W, Ru, Mo, Ir, Rh, and Pd.

Configuration 5

The magnetic head according to any one of Configurations 1 to 4, wherein a current is conductable to have an orientation from the second conductive layer toward the first conductive layer.

Configuration 6

The magnetic head according to Configuration 1 or 2, wherein the second ratio is 1.3 or less.

Configuration 7

The magnetic head according to Configuration 1, Configuration 2, or Configuration 6, wherein the second conductive layer includes at least one selected from the group consisting of Ta, Pt, W, Ru, Mo, Ir, Rh, and Pd.

Configuration 8

The magnetic head according to Configuration 1, Configuration 2, Configuration 6, or Configuration 7, wherein a current is conductable in a direction from the first conductive layer toward the second conductive layer via the magnetic layer.

Configuration 9

The magnetic head according to any one of Configurations 1 to 8, wherein the length of the magnetic layer along the second direction is not less than 1 nm and not more than 100 nm.

Configuration 10

The magnetic head according to Configuration 2, wherein the length of the magnetic layer along the third direction is not less than 10 nm and not more than 100 nm.

Configuration 11

The magnetic head according to any one of Configurations 1 to 3, wherein at least one of the first conductive layer or the second conductive layer includes at least one selected from the group consisting of Cu, Ag, Al, and Au.

Configuration 12

The magnetic head according to any one of Configurations 1 to 11, wherein a thickness of the magnetic layer along a direction perpendicular to the first shield surface is not less than 4 nm and not more than 20 nm.

Configuration 13

The magnetic head according to any one of Configurations 1 to 11, wherein a thickness of the first conductive layer along a direction perpendicular to the first shield surface and a thickness of the second conductive layer along the direction perpendicular to the first shield surface each are not less than 0.5 nm and not more than 10 nm.

Configuration 14

The magnetic head according to any one of Configurations 1 to 13, wherein a magnetization of the magnetic layer has a component in the reverse direction of a magnetic field generated from the magnetic pole when a current is caused to flow between the first conductive layer and the second conductive layer.

Configuration 15

The magnetic head according to any one of Configurations 1 to 14, wherein an electrical resistance between the magnetic pole and the second conductive layer when a first current is caused to flow between the first conductive layer and the second conductive layer is different from an electrical resistance between the magnetic pole and the second conductive layer when the first current is not caused to flow between the first conductive layer and the second conductive layer.

Configuration 16

The magnetic head according to any one of Configurations 1 to 14, wherein an electrical resistance between the first shield and the first conductive layer when a first current is caused to flow between the first conductive layer and the second conductive layer is different from an electrical resistance between the first shield and the first conductive layer when the first current is not caused to flow between the first conductive layer and the second conductive layer.

Configuration 17

The magnetic head according to any one of Configurations 1 to 14, wherein an electrical resistance between the magnetic pole and the first shield when a first current is caused to flow between the magnetic pole and the first shield is different from an electrical resistance between the magnetic pole and the first shield when the first current is not caused to flow between the magnetic pole and the first shield.

Configuration 18

A magnetic recording and reproducing device, comprising:
the magnetic head according to any one of Configurations 1 to 17;
a magnetic recording medium where information is recorded by the magnetic head; and
an electrical circuit configured to supply a current to a stacked body including the first conductive layer, the magnetic layer, and the second conductive layer.

According to the embodiments, a magnetic head and a magnetic recording and reproducing device can be provided in which it is possible to increase the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, magnetic layers, conductive layers, interconnects, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording and reproducing devices practicable by an appropriate design modification by one skilled in the art based on the magnetic heads, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a magnetic pole having a first surface;
a first shield separated from the magnetic pole along a first direction aligned with the first surface; and
a stacked body provided between the magnetic pole and the first shield,
the stacked body including
a magnetic layer including at least one selected from the group consisting of Fe, Co, and Ni,
a first conductive layer contacting the magnetic pole and the magnetic layer, being provided between the magnetic pole and the magnetic layer, and being nonmagnetic, and
a second conductive layer contacting the magnetic layer and the first shield, being provided between the magnetic layer and the first shield, and being nonmagnetic,
the first shield having a first shield surface contacting the second conductive layer,
a first ratio of a length of the magnetic layer along a second direction to a length of the first shield surface along the second direction being 0.1 or more and 1.5 or less, the second direction being perpendicular to the first surface.

2. The head according to claim 1, wherein a second ratio of a length of the magnetic layer along a third direction to a length of the magnetic pole along the third direction is 0.5 or more and 1.5 or less, the third direction being perpendicular to the first direction and perpendicular to the second direction.

3. The head according to claim 1, wherein the first ratio is 1.2 or less.

4. The head according to claim 1, wherein the first conductive layer includes at least one selected from the group consisting of Ta, Pt, W, Ru, Mo, Ir, Rh, and Pd.

5. The head according to claim 1, wherein a current is conductable to have an orientation from the second conductive layer toward the first conductive layer.

6. The head according to claim 2, wherein the second ratio is 1.3 or less.

7. The head according to claim 1, wherein the second conductive layer includes at least one selected from the group consisting of Ta, Pt, W, Ru, Mo, Ir, Rh, and Pd.

8. The head according to claim 1, wherein a current is conductable in a direction from the first conductive layer toward the second conductive layer via the magnetic layer.

9. The head according to claim 1, wherein the length of the magnetic layer along the second direction is not less than 1 nm and not more than 100 nm.

10. The head according to claim 2, wherein the length of the magnetic layer along the third direction is not less than 10 nm and not more than 100 nm.

11. The head according to claim 1, wherein at least one of the first conductive layer or the second conductive layer includes at least one selected from the group consisting of Cu, Ag, Al, and Au.

12. The head according to claim 1, wherein a thickness of the magnetic layer along a direction perpendicular to the first shield surface is not less than 4 nm and not more than 20 nm.

13. The head according to claim 1, wherein a thickness of the first conductive layer along a direction perpendicular to the first shield surface and a thickness of the second conductive layer along the direction perpendicular to the first shield surface each are not less than 0.5 nm and not more than 10 nm.

14. The head according to claim 1, wherein a magnetization of the magnetic layer has a component in a reverse direction of a magnetic field generated from the magnetic pole when a current is caused to flow between the first conductive layer and the second conductive layer.

15. The head according to claim 1, wherein an electrical resistance between the magnetic pole and the second conductive layer when a first current is caused to flow between the first conductive layer and the second conductive layer is different from an electrical resistance between the magnetic pole and the second conductive layer when the first current is not caused to flow between the first conductive layer and the second conductive layer.

16. The head according to claim 1, wherein an electrical resistance between the first shield and the first conductive layer when a first current is caused to flow between the first conductive layer and the second conductive layer is different from an electrical resistance between the first shield and the first conductive layer when the first current is not caused to flow between the first conductive layer and the second conductive layer.

17. The head according to claim 1, wherein an electrical resistance between the magnetic pole and the first shield when a first current is caused to flow between the magnetic pole and the first shield is different from an electrical resistance between the magnetic pole and the first shield when the first current is not caused to flow between the magnetic pole and the first shield.

18. A magnetic recording and reproducing device, comprising:
- the magnetic head according to claim 1;
- a magnetic recording medium where information is recorded by the magnetic head; and
- an electrical circuit configured to supply a current to a stacked body including the first conductive layer, the magnetic layer, and the second conductive layer.

\* \* \* \* \*